United States Patent [19]

Umezu

[11] Patent Number: 4,744,223
[45] Date of Patent: May 17, 1988

[54] AIR CONDITIONING APPARATUS
[75] Inventor: Kenji Umezu, Shizuoka, Japan
[73] Assignee: Kabushiki Kaisha Toshiba, Kawasaki, Japan
[21] Appl. No.: 934,820
[22] Filed: Nov. 25, 1986
[30] Foreign Application Priority Data
Nov. 29, 1985 [JP] Japan ................. 60-267201
[51] Int. Cl.$^4$ .............................. F25B 1/00
[52] U.S. Cl. ................. 62/176.5; 62/228.4; 236/44.6
[58] Field of Search ............ 62/176 E, 180, 203, 62/228.4; 236/44 C

[56] References Cited
U.S. PATENT DOCUMENTS 4,315,413  2/1982  Baker .................. 62/180
4,350,023  9/1982  Kuwabara et al. ....... 236/44 C
4,514,991  5/1985  Zinsmeyer ............. 62/228.4

FOREIGN PATENT DOCUMENTS 56-142338  11/1981  Japan .
57-37641   3/1982   Japan ................. 62/176.6
60-221647  11/1985  Japan .

Primary Examiner—William E. Wayner
Attorney, Agent, or Firm—Foley & Lardner, Schwartz, Jeffery, Schwaab, Mack, Blumenthal & Evans

[57] ABSTRACT

The air conditioning apparatus comprises a variable speed compressor provided outside of a room for compressing a refrigerant, a heat-exchanger provided inside of the room together with a blower, a controller for controlling the operation of the compressor and the blower, and a plurality of sensors connected with the controller for detecting room temperature, heat-exchanger temperature and humidity in the room. A switching means is further provided for selectively setting the operational mode of the controller, and means is further provided in the controller for controlling the rotating speed of the compressor and the quantity of air delivered from the blower based on the setting of the switching means and the outputs of the sensors such that during the cooling operation of the apparatus, the temperature of the heat-exchanger is varied in two or more predetermined ranges.

6 Claims, 5 Drawing Sheets

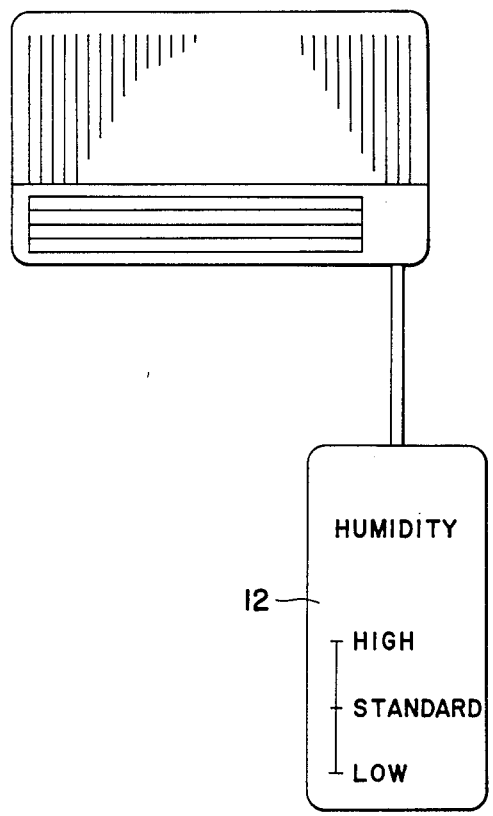
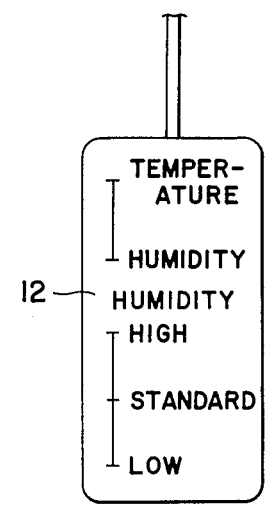
F I G. 7      F I G. 8

AIR CONDITIONING APPARATUS

BACKGROUND OF THE INVENTION

This invention relates to an air conditioning apparatus, and more specifically to an air conditioning apparatus capable of controlling room temperature as well as the humidity of the room.

In an ordinary variable capacity air conditioning apparatus including a compressor, the output of which is made variable, the control thereof is effected in consideration of the stability of the room temperature and the economy of the power consumption.

As is apparent from FIG. 1 showing a relation between the room temperature and the frequency of a power source for driving the compressor, the rotating speed of the compressor is reduced from 90 Hz to 30 Hz when the room temperature is brought nearer to a set value (or an object temperature) Ts. As a result, when the room temperature is settled in a range of from Ts+1 to Ts+2, the frequency of the driving source of the compressor is temporarily increased after a predetermined time period from 40 Hz to 50~60 Hz so that the room temperature is finally converged in a range between Ts and Ts+1 (Sometimes the temperature is reduced lower than Ts and the compressor is controlled to off state).

However, the temperature of the heat-exchanger is thereby made indefinite, and the dehumidifying capability of the apparatus is made uncontrollable. Thus in the night or else when the temperature is comparatively low, the temperature of the heat-exchanger has been reduced excessively, and sore throat and the like have been entailed. Otherwise in the rainy season where the room temperature becomes lower than a set value, a problem of being difficult to remove humidity because of the low room temperature has been liable to occur.

SUMMARY OF THE INVENTION

An object of the invention is to provide an air conditioning apparatus wherein the temperature control as well as the humidity control in a room can be executed simultaneously.

The object can be achieved by an air conditioning apparatus comprising: a variable speed compressor provided outside of a room for compressing a refrigerant; a heat-exchanger provided inside of the room for exchanging heat between the refrigerant and air; a blower provided inside of the room for delivering air passing through the heat-exchanger; a plurality of sensors for detecting room temperature, heat-exchanger temperature, and humidity in the room; a switching means for selectively setting an operational mode; and means for controlling the rotating speed of said compressor and the quantity of air delivered from said blower based on the setting of said switching means and the outputs of said sensors such that during a cooling operation of the apparatus, the temperature of said heat-exchanger is varied in two or more predetermined ranges.

BRIEF DESCRIPTION OF THE DRAWINGS

In the accompanying drawings:

FIG. 7 is a diagram showing an arrangement of an inside room unit and a remote controller of this embodiment; and FIG. 8 is a diagram showing a modification of the remote controller.

DESCRIPTION OF THE PREFERRED EMBODIMENT

A preferred embodiment of the present invention will now be described with reference to accompanying drawings.

Figure 2:
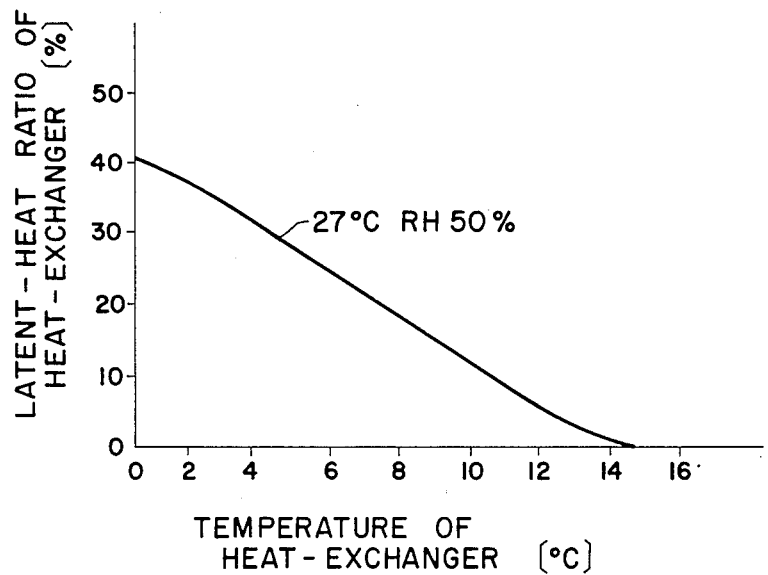
FIG. 2 is a graph showing a relation between the temperature of a heat-exchanger and the latent heat ratio under JIS (Japanese Industrial Standard) specified condition.

FIG. 2 illustrates a relation between the temperature of a heat-exchanger, provided within a room, of an ordinary air conditioning apparatus and the latent heat ratio (a ratio between the heat used for condensing vapor into water and the total heat) of the heat-exchanger, in a case where the room temperature is held at 27° C. and the relative humidity in the room is held at 50% (as specified in the Japanese Industrial Standard (JIS)). From FIG. 2, it is apparent that the latent heat ratio increases when the temperature of the heat-exchanger is reduced lower than 15.5° C., and that the latent heat ratio reaches 40% when the temperature of the heat exchanger is reduced to 0° C., that is, the amount of heat used for dehumidifying the room increases up to 40% of the entire cooling output of the apparatus. As a consequence, by controlling the temperature of the heat-exchanger, the latent heat ratio and hence the humidity within the room can be controlled.

Figure 3:
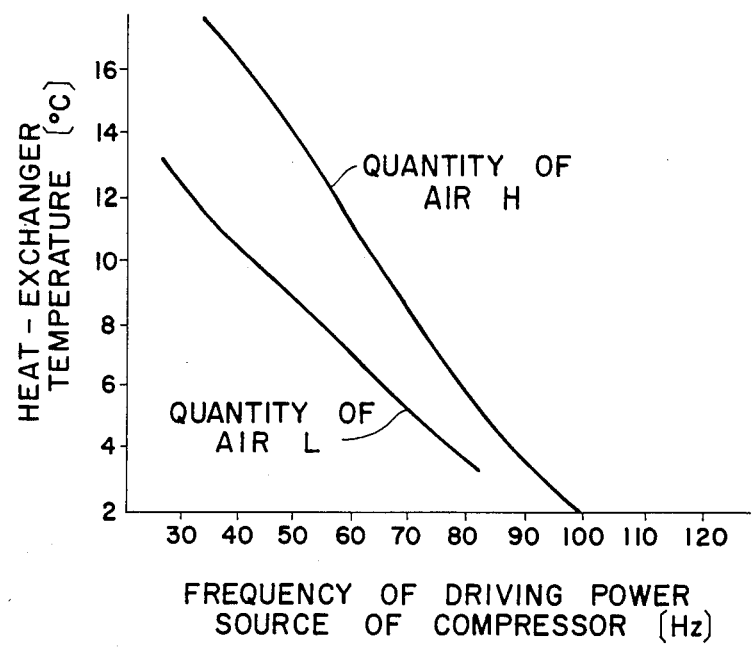
FIG. 3 is a graph showing a relation between the power source frequency and the temperature of the heat-exchanger at different amounts of supplied air.

FIG. 3 indicates a relation between the temperature of the heat-exchanger and the power source frequency for driving the compressor of an ordinary air conditioning apparatus when the amount of air passing through the heat-exchanger is held constant. As is apparent from FIG. 3, the temperature of the heat-exchanger becomes low when the amount of air is reduced and the power source frequency is increased.

Figure 4:
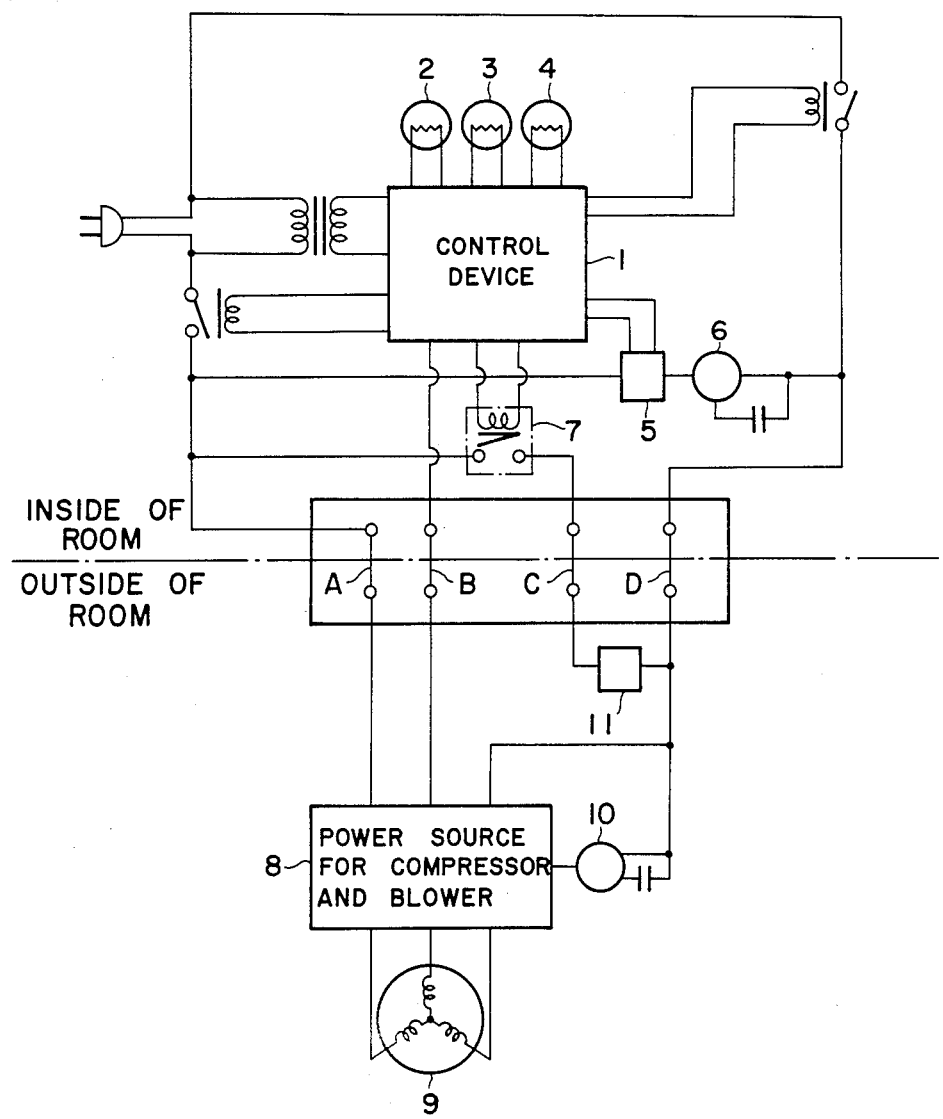
FIG. 4 is an electric circuit diagram showing a preferred embodiment of this invention.

The present invention is based on these findings, the construction of which will now be described with reference to FIG. 4 showing an electric circuit of the apparatus. In the drawing, those indicated upwardly of a one-dot-dash line are elements provided inside of a room, while those indicated downwardly of the line are elements provided outside of the room. The elements provided inside and outside of the room are connected through four cables A, B, C and D (cables A and D are power cables, cable B is one for controlling the rotating speed of a compressor, and cable C transmits signals for transferring the operation of the apparatus between cooling and warming modes). Within the room, a control device 1 is connected with a room-temperature sensor 2, a humidity sensor 3, and a sensor 4 for sensing the temperature of a heat-exchanger (not shown) provided in the room. Numeral 5 designates a power source for a fan motor 6, and numeral 7 designates a relay for controlling a four-way valve described hereinafter.

On the other hand, a power source device 8 is provided outside of the room for supplying electric power to a variable output compressor 9 and a fan motor 10. Numeral 11 designates the aforementioned four-way electromagnetic valve operated by the relay 7 so that the operation of the apparatus is transferred between the cooling and warming modes.

FIG. 7 illustrates a unit inclusive of the control device 1, heat-exchanger and the like provided in the room and a remote controller 12. A humidity controlling knob is provided in the remote controller 12 for transferring the control operation among a high humidity condition, a standard humidity condition, and a low humidity condition. Otherwise, the remote controller 12 may be constructed to include a transfer switch capable of transferring the operation of the apparatus between the conventional cooling mode operation and a mode of operation of this invention giving weight to a dehumidifying operation as shown in FIG. 8.

The operation of the air conditioning apparatus constituting the preferred embodiment of this invention will now be described.

Figure 1:
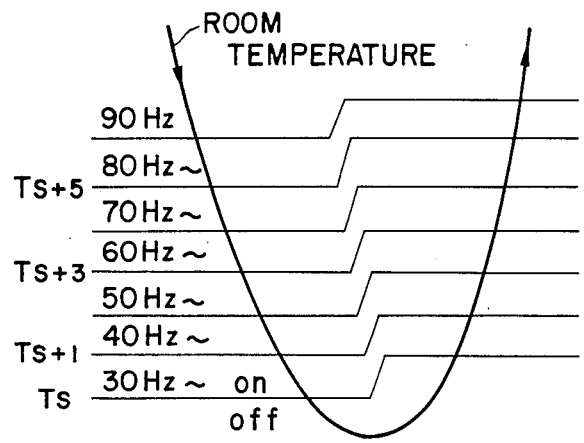
FIG. 1 is a graph showing a relation between the room temperature and the frequency of a driving power source for the compressor.
Figure 6:
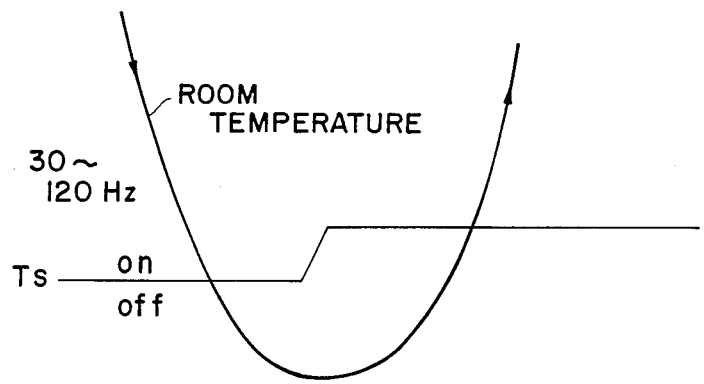
FIG. 6 is a graph similar to FIG. 1 showing the relation between the room temperature and the power source frequency of the embodiment of this invention.

The room temperature control of the embodiment is carried out in the form of ON-OFF control of the compressor driving power source as shown in FIG. 6 instead of the conventional manner which has been described hereinbefore with reference to FIG. 1. For instance when a high humidity control is selected, the frequency of the power source driving the compressor is controlled to a low value so that the temperature of the heat-exchanger is brought to a value higher than 12° C. (however, when the room temperature does not go down to a set value, the frequency of the power source is increased to a value capable of reducing the room temperature to the set value).

On the other hand, when a low humidity control is selected, the frequency of the power source is controlled to a high value bringing the temperature of the heat-exchanger to a value lower than approximately 5° C., or otherwise the amount of air sent to the heat-exchanger is reduced. In this case, when the room temperature is thereby reduced lower than the set value, the ON-OFF control of this invention described with reference to FIG. 6 is carried out, or otherwise the amount of air sent to the heat-exchanger is reduced.

In a case executing the ON-OFF control, since this control is carried out in a high-frequency region, the power efficiency thereof tends to be deteriorated. For avoiding such a difficulty, the latter procedure of reducing the amount of air sent to the heat-exchanger is preferred. Humidity is also controlled by this method, and the comfortable state within the room is thereby widely improved. Furthermore, a transfer switch capable of transferring the control between the conventional method and the method according to this invention may be provided in the remote controller 12 as shown in FIG. 8.

The above described control of this invention is executed by controlling the compressor and the blower under the instruction of a microcomputer provided as the control device 1 with reference made to the outputs of the room temperature sensor 2, humidity sensor 3 and the sensor 4 for sensing the temperature of the heat-exchanger.

Figure 5:
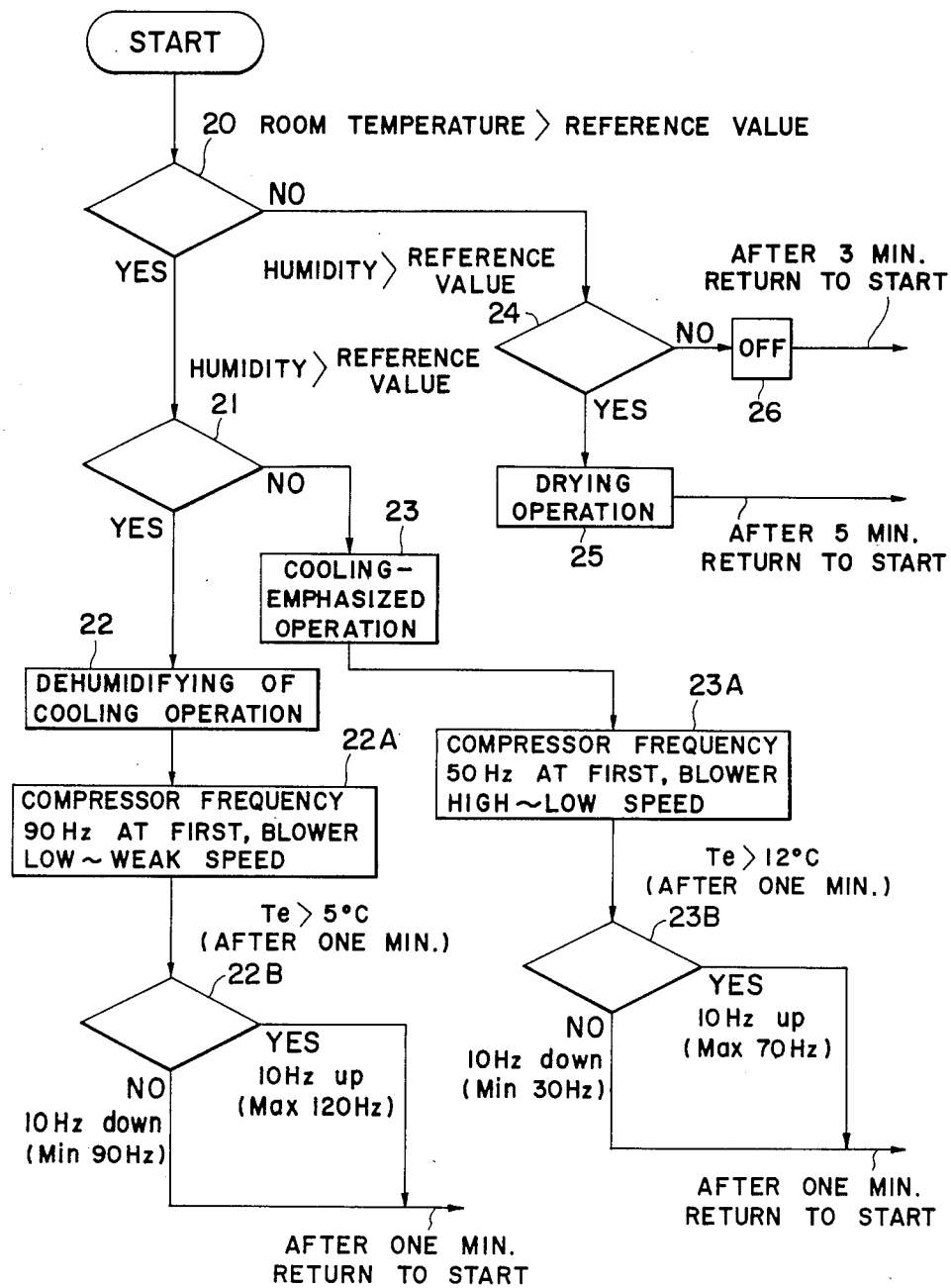
FIG. 5 is a flow chart showing the operation of the embodiment shown in FIG. 4.

The controlling procedure according to the present invention will now be described with reference to a flow chart shown in FIG. 5.

Firstly the room temperature is examined at a step 20, and the humidity is examined at a step 21. When a high humidity is judged at the step 21, the control is shifted to a subsequent step 22 (22A and 22B) where the operation of a high-frequency and a low amount of air (low evaporation temperature) is performed. Specifically, at first the frequency of the compressor 9 is set to 90 Hz (at a step 22A), and after one minute, whether Te (the temperature of the heat-exchanger) becomes 5° C. or not is checked (at a step 22B). When Te becomes 5° C., the frequency of the compressor 9 is increased by 10 Hz, and after one minute, the control returns to the start step. On the other hand, when Te does not become 5° C., the frequency of the compressor 9 is decreased by 10 Hz, and after one minute, the control returns to the start step.

On the other hand, in a case where a low humidity is judged in the step 21, the control is shifted to a step 23 (23A and 23B) where the operation of a low-frequency and a high amount of air (high evaporation temperature) is performed. Specifically, at first the frequency of the compressor 9 is set to 50 Hz (at a step 23A), and after one minute, whether Te becomes 12° C. or not is checked (at a step 23B). When Te becomes 12° C., the frequency of the compressor 9 is increased by 10 Hz, and after one minute, the operation returns to the start step. On the other hand, when Te does not become 12° C., the frequency of the compressor 9 is decreased by 10 Hz, and after one minute, the operation returns to the start step. Furthermore, when it is found in the step 20 that the room temperature is lower than a reference value, the operation is shifted to a step 24 where the humidity is compared with a reference value. When the step 24 judges that the humidity is high, the operation is shifted to a dry operation step 25 (low frequency—extremely low air amount), while when the step 24 judges that the humidity is low, the operation is shifted to a step 26 where the compressor is turned to OFF. Although in the step 21, the output of the humidity sensor is used, this may otherwise be determined by the user. More specifically, either one of a low humidity operation and a high humidity operation is selected by the remote controller, and when the low humidity operation is selected, the operation is shifted to the step 22 (22A and 22B), while when a high humidity operation is selected, the operation is shifted to the step 23 (23A and 23B), and the humidity is controlled as desired.

When no transfer switch as shown in FIG. 8 is provided in the remote controller 12, a desired value of the humidity is set as described above, and the selection between a control operation in which weight is given to humidity (temperature of the heat-exchanger is low) and a control operation in which weight is given to temperature (temperature of the heat-exchanger is high) is carried out in consideration of the result of a comparison between the sensed value by the sensor and the set value of the humidity.

According to the present invention, since the temperature of the heat-exchanger is made controllable in two or more predetermined ranges, an air conditioning apparatus capable of controlling the room temperature as well as the humidity thereof can be provided.

What is claimed is:
1. An air conditioning apparatus comprising:
 a variable speed compressor provided outside of a room for compressing a refrigerant;
 a heat-exchanger provided inside of the room for exchanging heat between the refrigerant and air;

a blower provided inside of the room for delivering air passing through the heat-exchanger;

a plurality of sensors for detecting room temperature, heat-exchanger temperature, and humidity in the room;

a switching means for selectively setting an operational mode; and means for controlling the rotating speed of said compressor and the quantity of air delivered from said blower based on the setting of said switching means and the outputs of said sensors such that during at least part of the operation of the apparatus, the rotating speed of the compressor is increased when the quantity of air is decreased, and the rotating speed of the compressor is decreased when the quantity of air is increased, to vary the temperature of said heat exchanger in two or more predetermined ranges.

2. The air conditioning apparatus according to claim 1, wherein in a case where a standard humidity operation is selected by said switching means, said controlling means controls the rotating speed of the compressor and the quantity of air delivered from said blower such that when the room temperature and the humidity in the room are both higher than reference values, the rotating speed is controlled to a high value while the delivery of air is controlled to a small value.

3. The air conditioning apparatus according to claim 1, wherein in a case where a high humidity operation is selected by said switching means, said controlling means controls the rotating speed of said compressor and the delivery of air such that the rotating speed becomes a low value while the delivery of air becomes a high value.

4. The air conditioning apparatus according to claim 1, wherein in a case where a low humidity operation is selected by said switching means, said control means controls the rotating speed of said compressor and the delivery of air such that the rotating speed becomes a high value and the delivery of air becomes a small value.

5. An air conditioning apparatus comprising:
a variable speed compressor for compressing a refrigerant;
a heat-exchanger for exchanging heat between the refrigerant and air;
a blower for delivering air passing through the heat-exchanger;
a plurality of sensors for detecting room temperature, heat-exchanger temperature, and humidity in the room;
a switching means for selectively setting an operational mode;

means for executing an ON-OFF control of said compressor based on a comparison between the room temperature and a predetermined reference valve;

means for selecting dehumidifying-cooling operation or cooling-emphasized operation based on a comparison between the humidity in the room and a reference valve determined according to the operational mode set by said switching means; and means for controlling the rotating speed of said compressor and the quantity of air delivered from said blower such that when said selecting means selects said dehumidifying-cooling operation, the rotating speed of said compressor increases while the delivery of air from said blower decreases in order to keep the heat-exchanger temperature at a predetermined low temperature, and such that when said selecting means selects said cooling-emphasized operation, the rotating speed of said compressor decreases while the delivery of air from said blower increases in order to keep the heat-exchanger temperature at a predetermined high temperature.

6. A method of operating an air conditioning apparatus including a variable speed compressor for compressing a refrigerant, a heat exchanger for exchanging heat between the refrigerant and air, a blower for delivering air passing through the heat exchanger, and a plurality of sensors for detecting room temperature, heat-exchanger temperature, and humidity in the room, said method comprising the steps of:

selecting an operational mode with a switching means;

executing an ON-OFF control of said compressor based on a comparison between the room temperature and a predetermined reference value;

selecting a dehumidifying-cooling operation or cooling-emphasized operation based on a comparison between the humidity in the room and reference value determined according to the operational mode set by said switching means; and controlling the rotating speed of said compressor and the quantity of air delivered from said blower such that when said selecting means selects said dehumidifying-cooling operation, the rotating speed of said compressor increases while the delivery of air from said blower decreases in order to keep the heat-exchanger temperature at a predetermined low temperature, and such that when said selecting means selects said cooling-emphasized operation, rotating speed of said compressor decreases while the delivery of air from said blower increases in order to keep the heat-exchanger temperature at a predetermined high temperature.

* * * * *